US010033717B2

(12) United States Patent
Wang et al.

(10) Patent No.: US 10,033,717 B2
(45) Date of Patent: Jul. 24, 2018

(54) TERMINAL SINGLE SIGN-ON CONFIGURATION, AUTHENTICATION METHOD, AND SYSTEM, AND APPLICATION SERVICE SYSTEM THEREOF

(71) Applicant: Sangfor Technologies Company Limited, Shenzhen (CN)

(72) Inventors: Shican Wang, Shenzhen (CN); Jianxin Qian, Shenzhen (CN); Shizhi Huang, Shenzhen (CN)

(73) Assignee: SANGFOR TECHNOLOGIES INC., Shenzhen (CN)

( * ) Notice: Subject to any disclaimer, the term of this patent is extended or adjusted under 35 U.S.C. 154(b) by 186 days.

(21) Appl. No.: 15/083,454

(22) Filed: Mar. 29, 2016

(65) Prior Publication Data
US 2016/0294810 A1  Oct. 6, 2016

(30) Foreign Application Priority Data
Mar. 31, 2015  (CN) .......................... 2015 1 0148643

(51) Int. Cl.
*H04L 29/06* (2006.01)
*G06F 17/30* (2006.01)
*G06F 15/16* (2006.01)
*G06F 7/04* (2006.01)

(52) U.S. Cl.
CPC ...... *H04L 63/0815* (2013.01); *H04L 63/0272* (2013.01)

(58) Field of Classification Search
CPC .................. H04L 63/0815; H04L 63/0272

USPC .............................................. 726/8
See application file for complete search history.

(56) References Cited

U.S. PATENT DOCUMENTS

| 9,047,282 B2 * | 6/2015 | Uchida ............. G06F 17/30011 |
| 9,344,883 B2 * | 5/2016 | Perry .................... H04W 12/06 |
| 2004/0073536 A1 * | 4/2004 | Smith-Semedo ......... G06F 1/14 |
| 2005/0138373 A1 * | 6/2005 | Clark ...................... G06F 21/31 |
| | | 713/166 |

(Continued)

OTHER PUBLICATIONS

Malcolm Levy; IP130, IP350, IP380 Firewall/VPN Appliances with Check Point VPN-1/FireWall-1 NG FP2; Nokia:2005; pp. 1-48.*

*Primary Examiner* — Monjour Rahim
(74) *Attorney, Agent, or Firm* — Anova Law Group, PLLC

(57) ABSTRACT

The present invention provides a terminal single sign-on configuration, authentication method, and system. The terminal single sign-on authentication method includes obtaining a VPN login information for accessing a private virtual network, where the application service system is installed on a mobile terminal; and uploading the VPN login information to a server for verification. When the VPN login information is successfully verified, a recorded script associated with the VPN login information is obtained from the server, the recorded script containing a plurality of operations and login parameters corresponding to input controls in a user interface of the application service system for authentication. The method further includes according to the recorded script, automatically replaying the plurality of operations to input the login parameters to the corresponding input controls in the user interface, such that an authentication process for the application service system is completed automatically.

16 Claims, 5 Drawing Sheets

(56) References Cited

U.S. PATENT DOCUMENTS

| | | | |
|---|---|---|---|
| 2008/0162720 A1* | 7/2008 | Gulati | H04L 63/20 709/238 |
| 2009/0282346 A1* | 11/2009 | Bechtel | G06Q 10/10 715/751 |
| 2009/0319462 A1* | 12/2009 | Tirpak | G06F 9/4443 706/47 |
| 2010/0142410 A1* | 6/2010 | Huynh Van | H04L 12/4633 370/255 |
| 2015/0310205 A1* | 10/2015 | Pruthi | G06F 21/46 726/25 |

* cited by examiner

TERMINAL SINGLE SIGN-ON CONFIGURATION, AUTHENTICATION METHOD, AND SYSTEM, AND APPLICATION SERVICE SYSTEM THEREOF

CROSS-REFERENCES TO RELATED APPLICATIONS

This application claims the priority of Chinese Patent Application No. 201510148643.5, filed on Mar. 31, 2015, the entire contents of which is incorporated herein by reference.

FIELD OF THE DISCLOSURE

The present disclosure relates to the field of network authentication technologies for EMM (Enterprise Mobile Management) and, more particularly, relates to a terminal single sign-on configuration, authentication method, and system, and an application service system thereof.

BACKGROUND

With the rapid development of mobile network, more and more enterprise office systems are migrated to mobile terminals, which brings a series of new issues. The issues may include how to provide secure access to the corporate intranet from the mobile office system, how to implement a centralized management of the mobile devices and applications, how to ensure data security when a device is lost, etc. EMM (Enterprise Mobile Management) technologies are developed to address these issues. When implementing mobile information operation, business may utilize EMM technologies to build a management platform to arrange and control enterprise applications.

One of the key features of EMM is to provide various APPs with capabilities to securely connect to the corporate intranet. The principle is to inject a secure tunnel module to the various APPs. The secure tunnel module may hijack the original network connection of the APP, redirect the network connection to the corporate VPN (Virtual Private Network) through the secure tunnel, and connect to the corporate intranet server through the corporate VPN. Thus, a mobile APP may connect to the corporate intranet at any location.

Before EMM establishes the secure tunnel to connect the APP to the corporate intranet, an identity authentication process needs to be performed. Only authenticated users may use the secure tunnel. When an APP visits the corporate intranet system, there is also an authentication process. Although a secure tunnel is established for the APP, a user may need to input login information twice to actually access the intranet system, which may affect the user experience.

The disclosed method and system are directed to solve one or more problems set forth above and other problems.

BRIEF SUMMARY OF THE DISCLOSURE

One aspect of the present disclosure provides a terminal single sign-on (SSO) configuration method. The method may include establishing a connection between a configuration system and an application service system, where the application service system refers to an application program installed on a mobile terminal. The configuration system may receive, in real time, a user interface for authentication from the application service system and may generate interface elements corresponding to input controls in the user interface received in real time. The method may further include sequentially transmitting operation information and login parameters of the interface elements from the configuration system to the application service system; and sequentially recording a plurality of operations on the input controls in the user interface according to the operation information and the login parameters of the corresponding interface elements. The plurality of operations may complete an authentication process for the application service system. Further, a recorded script may be generated containing the plurality of operations and the login parameters of the interface elements and be associated with a VPN (virtual private network) login information with the recorded script. The VPN login information and the associated recorded script may be uploaded to a server. When the application service system is launched next time on the mobile terminal, the application service system automatically obtains the recorded script associated with the VPN login information from the server, and automatically replays the plurality of operations to complete the authentication process.

Another aspect of the present disclosure provides a terminal single sign-on authentication method, including: obtaining, by an application service system, a VPN login information for accessing a private virtual network, wherein the application service system is installed on a mobile terminal; and uploading, by the application service system, the VPN login information to a server for verification. When the VPN login information is successfully verified, a recorded script associated with the VPN login information is obtained from the server, the recorded script containing a plurality of operations and login parameters corresponding to input controls in a user interface of the application service system for authentication. The method further includes according to the recorded script, automatically replaying the plurality of operations to input the login parameters to the corresponding input controls in the user interface, such that an authentication process for the application service system is completed automatically.

Another aspect of the present disclosure provides a terminal single sign-on authentication system including one or more processors configured to: obtain, through an application service system, a VPN login information for accessing a private virtual network, where the application service system is installed on a mobile terminal; upload the VPN login information to a server for verification. When the VPN login information is successfully verified, a recorded script associated with the VPN login information is obtained from the recorded script containing a plurality of operations and login parameters corresponding to input controls in a user interface of the application service system for authentication. Further, the one or more processors are configured to according to the recorded script, automatically replay the plurality of operations to input the login parameters to the corresponding input controls in the user interface, such that an authentication process for the application service system is completed automatically.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
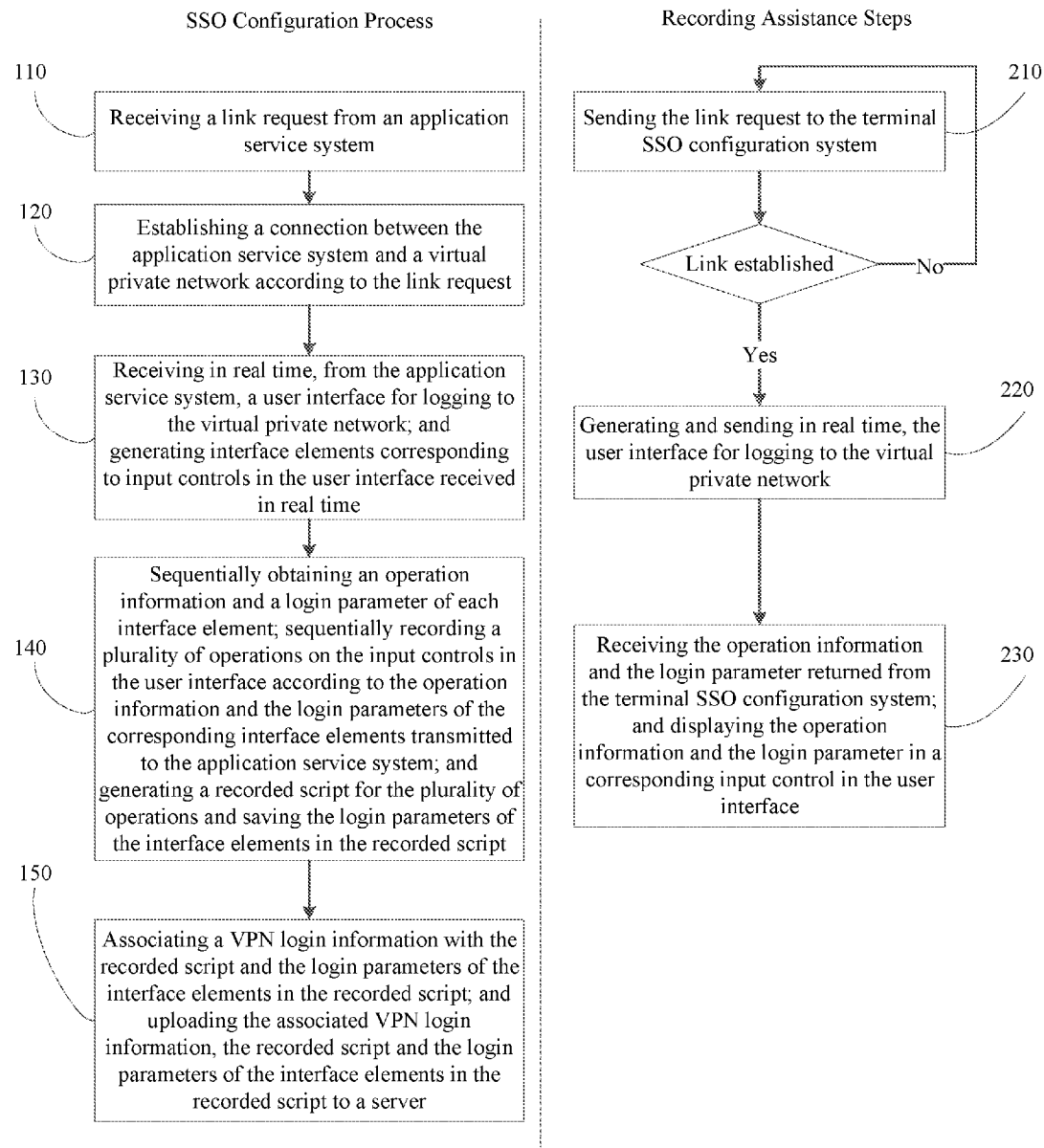
FIG. 1 illustrates a flow chart of an exemplary terminal single sign-on (SSO) configuration process and a corresponding exemplary recording assistance process consistent with the disclosed embodiments.

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

As used herein, the term "inject" may refer to adding extra executable code to an existing executable program to increase the functionality of the program. For example, injecting code for secure tunnel and injecting code for single sign-on may refer to adding a dynamic library to the program such that secure tunnel and single sign-on functions are added to the program. Secure tunnel may generally refer to VPN technologies which establish network connection between applications and corporate intranet, and encrypt the connection and data with encryption technologies such as SSL (Secure Sockets Layer). A secure tunnel may be used after identity authentication. In other words, a user may need to be first authenticated by the VPN to initiate the connection from the APP to the corporate intranet. SSO (Single Sign-On) is one of the popular solutions for business application integration. When there are multiple application systems, SSO may allow the user to access all trusting application systems with a single login operation.

An application service system, as used herein, may refer to an APP (application program) containing network authentication functionalities based on EMM technologies (e.g., an APP injected with code for implementing the secure tunnel function). The application service system may be installed on a user terminal. In one example, when a user launches the APP, a VPN login information may be required at first to initiate a link to the VPN, and then credentials for authenticating the APP may be requested to connect the APP to a corporate intranet system through the VPN. In another example, a VPN login information may be requested on the mobile terminal for accessing an EMM platform, and when the user launches the APP afterwards, credentials for APP authentication may be required. Further, when the user launches multiple APPs, authentications may be required for each APP. The present disclosure provides a terminal single sign-on configuration and authentication method which can be applied to these cases, such that the user may perform the sign-on activity just once to use the APP(s).

Based on network authentication technologies in EMM (Enterprise Mobile Management), the present disclosure provides a method and system for terminal single sign-on configuration and authentication. By recording operation procedures and login parameters when an administrator connects to a VPN (Virtual Private Network) on a same mobile terminal, the present disclosure provides automatic login functionalities with one-time authentication (i.e., single sign-on) when the mobile terminal requests access to the VPN through an APP (i.e., application program). Further, the present disclosure may provide single sign-on and automatic login functionalities for multiple APPs on a same mobile terminal that request access to the VPN.

FIG. 1 illustrates a flow chart of an exemplary terminal single sign-on (SSO) configuration process and a flow chart of an exemplary recording assistance process consistent with the disclosed embodiments. As shown in FIG. 1, an exemplary terminal single sign-on (SSO) configuration method may include the following steps. The exemplary method may be implemented by, for example, a terminal SSO configuration system.

Step S110: A link request from an application service system may be received. The application service system may host an APP on a mobile terminal of a user.

Step S120: Based on the link request, a connection may be established between the application service system and a virtual private network (S120).

Step S130: A user interface from the application service system for authentication may be received in real time. The authentication may be used for accessing a corporate intranet system through the VPN, or accessing a specific service or content hosted on the corporate intranet system, or accessing the APP itself. Based on a plurality of input controls in the received user interface, corresponding interface elements may be generated and displayed on a terminal of an administrator. The user interface may refer to an authentication UI (User Interface) in the APP. The administrator may perform login operations (e.g., input login parameters to text fields, select a button, check a box, etc.) based on the displayed interface elements on the administration terminal.

Step S140: Operation information and login parameters corresponding to all interface elements may be obtained sequentially. Multiple operations performed on input controls in the user interface may be recorded sequentially. Specifically, an operation information and a login parameter of an interface element corresponding to an input control may be transmitted to the application service system. Each operation may be performed based on the operation information and the login parameter corresponding to the input control, and may be presented in the user interface. A recorded script may be generated. The login parameters of the interface elements in the recorded script may also be stored.

Step S150: The recorded script and the login parameters corresponding to the interface elements in the recorded script may be associated with login information of the virtual private network. The associated data (i.e., the recorded script, the login parameters corresponding to the interface elements in the recorded script, the associated VPN login information) may be uploaded to a server. The server may be a single sign-on authentication server, and may also be referred to as a VPN authentication server, or a VPN SSO authentication server.

Steps S110 to S130 shown in FIG. 1 may be referred as link establishment steps for realizing connections between the system administrator and the application service system, and for displaying, in real-time, VPN login interface of the application service system on the mobile terminal to the system administrator. The application service system may refer to an APP executed on terminal devices. The terminal devices may include, but not limited to, mobile phones, laptop computers, desktop computers, etc. That is, the disclosed method and system may be applied to any computation terminal devices that are not in the local area internet (LAN) of the office place.

In one embodiment, Step S130 may further include receiving the user interface from the application service system and, based on the input controls in the UI and the coordinate information of the input controls in the UI, generating corresponding interface elements. Each interface element may correspond to one input control label and current coordinates of the input control in the displayed user interface. The input controls in the user interface may include control areas displayed in the user interface that allows a user to input information, such as entering a username, entering a password, selecting a "next step" option, selecting a "confirm" button, etc.

In one embodiment, by coordinate positioning, the authentication user interface of the application service system on the terminal device may be copied to an interface operated by a system administrator. Thus, the task of configuring the login information when the application system logs in the VPN for the first time may be accomplished through the system administrator. In Step S140, the operation information and login parameter corresponding to each interface element may be effectively displayed in a corresponding input control in the user interface on the terminal device.

The operation information may include: a selection instruction generated when the system administrator selects an interface element, and current coordinates of an input control in the user interface corresponding to the interface element. The login parameters may include configuration information corresponding to the input control, such as username, password, etc.

Step S140 shown in FIG. 1 may be referred to as a recording step. The system administrator may perform operations on a plurality of interface elements corresponding to the user interface of the application service system for logging to the virtual private network, and these operations may be recorded sequentially to a script. The recorded script generated in this step may include operations on the plurality of interface elements and the sequence of performing these operations. In one embodiment, each operation may further include two steps.

In the first step, the operation information of one interface element may be obtained (e.g., based on an operation performed by the system administrator). The operation information of the one interface element may be transmitted to the application service system to be displayed in corresponding input controls in the user interface. A part of the recorded script is generated based on the one operation.

In the second step, a field tag may be assigned to the one interface element (e.g., by the system administrator), and the login parameter configured for the field tag may be obtained. The login parameter may be transmitted to the application service system to be displayed on the corresponding input control of the user interface. The field tag and the login parameter are corresponded and recorded. For example, the system administrator may label an input control named "username" as "username field", and assign a corresponding field tag.

Further, the system administrator may assign the value of the field tag to be the login parameter of username. For example, the value of the field tag corresponding to "username field" may be directly assigned as the username for VPN authentication. Similarly, the system administrator may assign corresponding field tags to other input controls, such as input controls named "password", "next step", etc. Further, the system administrator may assign login parameters to the field tags. For example, the value of "username field" may be configured based on the user information and/or the mobile terminal information. A click operation may be assigned to the "next step field". In some embodiments, the system administrator may assign the value of the "username field" and "password field" based on the VPN login information of the user. For example, the value of "password field" may be configured to be the same as the password for VPN authentication.

In one embodiment, based on the previously described two steps, Step S150 may further include associating VPN login information with the field tags and corresponding login parameters in the recorded script, and uploading the associated data to the server.

In some embodiments, the disclosed method may include injecting a same SSO configuration system to multiple application service systems (i.e., target APPs) to implement a universal login interface (e.g., the user interface for accessing the corporate intranet system), recording operation process of same type field tags and login parameters in the login interface, uploading and saving the recorded process. Thus, different target APPs may inquire and obtain the recorded script, field tags and login parameters in the record script based on the login interface for authentication. Thus, an information sharing service may be provided for a plurality of target APPs to login the VPN from the mobile terminal. Each APP that has been injected with the terminal SSO configuration system may connect to the intranet directly from the mobile terminal, instead of manually entering the login information every time the user launches the APP.

In one embodiment, the recording step may further include: assigning a field tag to an interface element, corresponding the field tag with the login parameter, and recording the correspondence between the field tag and the login parameter.

Step S150 shown in FIG. 1 may be referred as an upload step. In the upload step, the VPN login information is associated with the recorded script and login parameters corresponding to the interface elements in the recorded script. A copy of these information may be backed up on the server (e.g., the VPN SSO server). Next login may just require the VPN login information such that a single sign-on may be accomplished, and the user may just go through the authentication process one time for allowing the application service system to access the corporate intranet system. The VPN login information may include information for entering VPN authentication credentials, such as a configured user code.

In other words, by implementing the disclosed SSO configuration and authentication method, when the upload step is completed, the user may just enter the VPN login information for one time, instead of going through the authentication process twice (e.g., one for logging into the VPN on the mobile terminal, one for accessing the VPN through the APP). One or more application service systems may obtain the recorded script and login parameters associated with the VPN login information from the VPN SSO server, and replay the recorded operations to automatically log the APP into the VPN, and thus the single sign-on may be realized.

Figure 3:
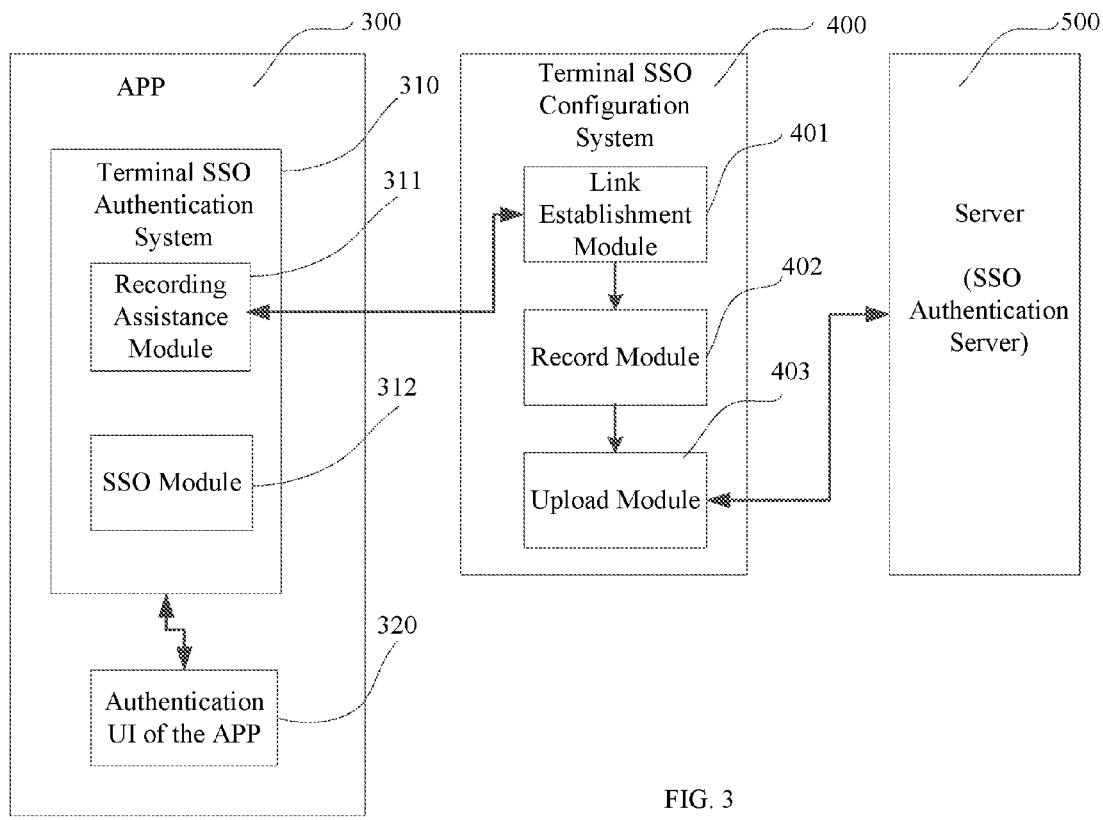
FIG. 3 illustrates a structural diagram of an exemplary terminal SSO configuration system and an exemplary terminal SSO authentication system consistent with the disclosed embodiments.

The present disclosure further provides a terminal SSO configuration system. FIG. 3 illustrates a structural diagram of an exemplary terminal SSO configuration system 400 consistent with the disclosed embodiments. The system 400 may implement the terminal SSO configuration process shown in FIG. 1. As shown in FIG. 3, the exemplary system 400 may include a link establishment module 401, a record module 402, and an upload module 403.

The link establishment module 401 may be configured to, receive a link request from the application service system, establish a connection between the application service system and a virtual private network based on the link request, receive a real-time user interface for authentication from the application service system (e.g., authentication user interface of the APP 320), and generate interface elements corresponding to a plurality of input controls based on the received real-time user interface.

The record module 402 may be configured to, sequentially obtain operation information and login parameters of all interface elements, and sequentially record multiple operations performed on the input controls in the user interface according to operation information and login parameters of the corresponding interface elements transmitted to the application service system. The multiple operations may be displayed in the user interface. The record module 402 may be further configured to generate a recorded script and save the login parameters of the interface elements in the recorded script.

The upload module 403 may be configured to associate VPN login information with the recorded script and the login parameters corresponding to the interface elements in the recorded script, and upload the associated data (e.g., the recorded script and the login parameters associated with the VPN login information) to the server 500.

In one embodiment, the record module 402 may further include a script recording unit and a parameter configuration unit.

For each operation, the script record unit may obtain the operation information of an interface element, transmit operation information of each interface element to the application service system such that an operation on a corresponding input control in the user interface is performed and displayed, and generate a part of the recorded script about this operation process.

The parameter configuration unit may be configured to assign a field tag to the interface element, obtain the login parameter configured for the field tag, transmit the login parameter to the application service system to be displayed in the corresponding input control in the user interface. The parameter configuration unit may be further configured to correspond and save the field tag and the login parameter.

In one embodiment, the record module 402 may further include a field configuration unit configured to assign a field tag to each interface element respectively, record and save the correspondence between a field tag and its login parameter. For example, the parameter configuration unit may obtain the login parameter configured for the field tag from the field configuration unit.

The link establishment module 401 may be configured to execute Steps S110-S130 in the exemplary terminal SSO configuration process shown in FIG. 1. The record module 402 may be configured to execute Step S140 in the exemplary terminal SSO configuration process shown in FIG. 1. The upload module 403 may be configured to execute Step S150 in the exemplary terminal SSO configuration process shown in FIG. 1. Thus, the detailed implementation of these modules may refer to the descriptions of the Steps S110-S150.

The terminal SSO configuration system 400 shown in FIG. 3 may be an independent running program, may run on a PC, a mobile terminal or a server, and may work with the application service system collaboratively to record the procedures of an APP logging into the intranet system, to generate the recorded script, and to upload the recorded script to the server (e.g., VPN SSO authentication server). When the terminal SSO configuration system 400 is running on a PC, the screens on the mobile terminal when executing the APP may be displayed (e.g., on the PC) through the application service system. An administrator may select an input control (e.g., username input box, password input box, login button, next step button, etc.) of the APP by a mouse, and label the input control with a corresponding field tag (e.g., username field, password field), which may be saved in the recorded script. The terminal SSO configuration method and the terminal SSO configuration system 400 may accomplish, before the implementation of single sign-on and with the collaboration of the application service system, recording the procedure of the target APP logging to the intranet system performed by the system administrator.

When the terminal SSO configuration system implements the terminal SSO configuration method shown in FIG. 1, such as the step of obtaining the recorded script, the application service system may implement a terminal SSO authentication method. As shown in FIG. 1, the terminal SSO authentication method may include the following record assistance steps.

Step S210: The application service system may send a link request to the terminal SSO configuration system 400 shown in FIG. 3 (S210).

Step S220: When the connection to the terminal SSO configuration system 400 is established, a user interface for authentication may be generated by the application service system and transmitted to the terminal SSO configuration system 400 in real time.

Step S230: The application service system may receive operation information and login parameters from the terminal SSO configuration system 400, and present the operation information and login parameters on the corresponding input controls in the user interface. The operation information and login parameters may refer to the operation information and login parameters obtained from corresponding interface elements generated by the terminal SSO configuration system 400 based on the real-time user interface of the application service system.

Further, in Step S230, the application service system may receive a selection instruction in the feedback from the terminal SSO configuration system 400. The selection instruction may be generated by the terminal SSO configuration system 400 when an interface element is selected (e.g., by the system administrator). Further, the application service system may obtain current coordinates of an input control in the user interface corresponding to the selected interface element. According to the coordinates, the input control in the user interface may be determined. According to the selection instruction, the input control may be chosen and corresponding login parameters may be entered.

Steps S210-S230 may be executed by the application service system to cooperate with the various steps executed by the terminal SSO configuration system 400. Before implementing single sign-on of the application service system, the system administrator may operate the terminal SSO configuration system with the collaboration of the application service system, and the recording process about the target APP logging to the intranet system may be accomplished.

When the recording process is completed, and when a user operates the target APP to login to the intranet system, the following steps of the terminal SSO authentication method may be executed to implement a single sign-on process. In some embodiments, when the username and password for the virtual private network is authenticated once, all APPs in the same mobile terminal may be able to connect to the corporate intranet system directly without manually entering authentications to access the corporate intranet system for each APP.

Figure 2:
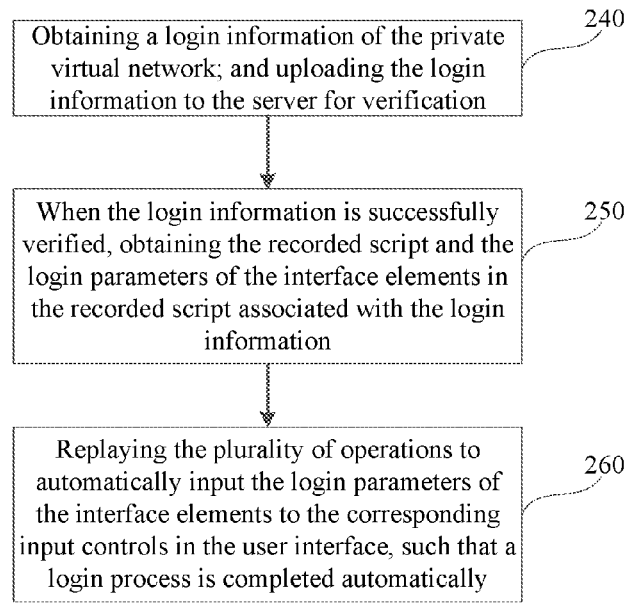
FIG. 2 illustrates a flow chart of an exemplary terminal single sign-on (SSO) authentication process consistent with the disclosed embodiments.

As shown in FIG. 2, an exemplary terminal SSO authentication process based on the terminal SSO configuration system shown in FIG. 3 may include the following steps.

Step S240: The application service system (i.e., the target APP) may be activated/launched. The terminal SSO authentication system may be loaded to obtain the VPN login information. The VPN login information may be uploaded to the server for verification.

The server may be the VPN SSO server. In one embodiment, the terminal SSO authentication system may obtain the VPN login information from user input. In another embodiment, the user may have already entered the VPN login information when launching an EMM platform on the mobile terminal or when launching another APP on the mobile terminal previously, the terminal SSO authentication system may obtain the entered login information without asking the user to enter the login information for a second time.

Step S250: When the verification is successful, according to the login information, the associated recorded script and login parameters of interface elements in the recorded script may be obtained from the server. Further, a distribution request may be sent to the server. When the server receives the request, the server may distribute, to the application service system, the recorded script associated with the VPN login information, together with the login parameters of various interface elements in the recorded script.

Step S260: According to the recorded script, playback operations may be performed and the login parameters corresponding to the interface elements may be inputted to the various login controls automatically. Thus, an automated login process may be completed. The recorded script and the login parameters corresponding to various interface elements in the recorded script may be obtained from real-time recording performed by the terminal SSO configuration system. The recorded script and the login parameters corresponding to various interface elements in the recorded script are generated from multiple operations of the terminal SSO configuration system, including: receiving interface elements from the VPN login user interface generated by the application service system, sequentially receiving operation information and login parameters of all the interface elements, sequentially recording operation information and login parameter corresponding to each interface element, and transmitting the recorded data to the application service system to be displayed in the corresponding input controls on the user interface.

The recorded script and login parameters described in the Steps S240-S260 may be generated by the terminal SSO configuration system shown in FIG. 3 when executing the link establishment step and the recording step. The detailed implementation may refer to the related paragraphs.

In various embodiments, when a user operates the mobile terminal that has successfully authenticated by the VPN, an SSO module may obtain previously recorded script and login parameters from the VPN SSO server, replay the recorded operations, fill in corresponding control inputs in the APP that required to login to the intranet system, and automatically select the login button. Thus, the APP may be automatically logged into the corporate intranet system.

The disclosed SSO authentication method provides a solution for single sign-on using injected APPs based on EMM. A user may be authenticated to the VPN just once (single sign-on), and the injected APP may automatically log in the corporate intranet system. When the VPN authentication is successful, all injected APPs on a same mobile terminal may directly access the corporate intranet without the user manually entering verification for the corporate intranet system. To accommodate various different APPs, the terminal SSO authentication system may be injected to the different APPs, and cooperate with the terminal SSO configuration system to record the procedure of any desired APP logging into the VPN. When the one-time recording is finished, with a relatively simple VPN authentication (e.g., VPN authentication code), automatic filling of relatively complex network login information may be accomplished. Further manual operation can be omitted. Thus, single sign-on to the corporate intranet may be implemented.

The terminal SSO authentication method illustrated in FIGS. 1-2 may include two parts. The first part may include cooperating with the terminal SSO configuration system shown in FIG. 3 to record the procedure of the APP logging to the intranet system. The second part may include, according to the recorded information from the first part, by entering VPN login information (the login information may include VPN username and password that configured by the system administrator, or a simple code configured by the system administrator) for one time, the target APP may be enabled to automatically connect to the intranet system. Combining the functionalities of the two parts, the present disclosure further provides the terminal SSO authentication system shown in FIG. 3.

In one embodiment, as shown in FIG. 3, the terminal SSO authentication system 310 may include a recording assistance module 311 and an SSO module 312.

The record assistance module 311 may be configured to initiate a link request to the terminal SSO configuration system. When the connection to the terminal SSO configuration system 400 is established, the record assistance module 311 may be configured to generate a user interface for logging into the virtual private network, transmit the user interface 320 (e.g., verification UI of the APP) to the terminal SSO configuration system 400 in real time, receive operation information and login parameters in the feedback information from the terminal SSO configuration system 400, and display the operations and login parameters in the corresponding input controls in the user interface. The operation information and login parameters may refer to the operation information and login parameters obtained from corresponding interface elements generated by the terminal SSO configuration system 400 based on the real-time user interface of the application service system 300.

The SSO module 312 may be configured to obtain VPN login information, and upload the login information to the server 500 for verification. When the verification is successful, according to the login information, the SSO module 312 may be further configured to obtain the recorded script and login parameters corresponding to various interface elements in the recorded script associated with the login information. Further, the SSO module 312 may be configured to, based on the recorded script, replay operations and automatically input login parameters corresponding to the interface elements to the input controls on the user interface 320, and complete the automated login process. The recorded script and the login parameters corresponding to various interface elements in the recorded script may be obtained from real-time recording performed by the terminal SSO configuration system 400, which sequentially records a plurality of operations on the input controls in the user interface according to the operation information and the login parameters of the corresponding interface elements transmitted to the application service system 300.

When the target APP access the corporate intranet system for the first time, the recording assistance module 311 may facilitate the terminal SSO configuration system 400 to complete the configuration and recording procedure. When the first time access is completed, the SSO module 312 may further implement single sign-on functionalities for the target APP to access the corporate intranet system.

Figure 4:
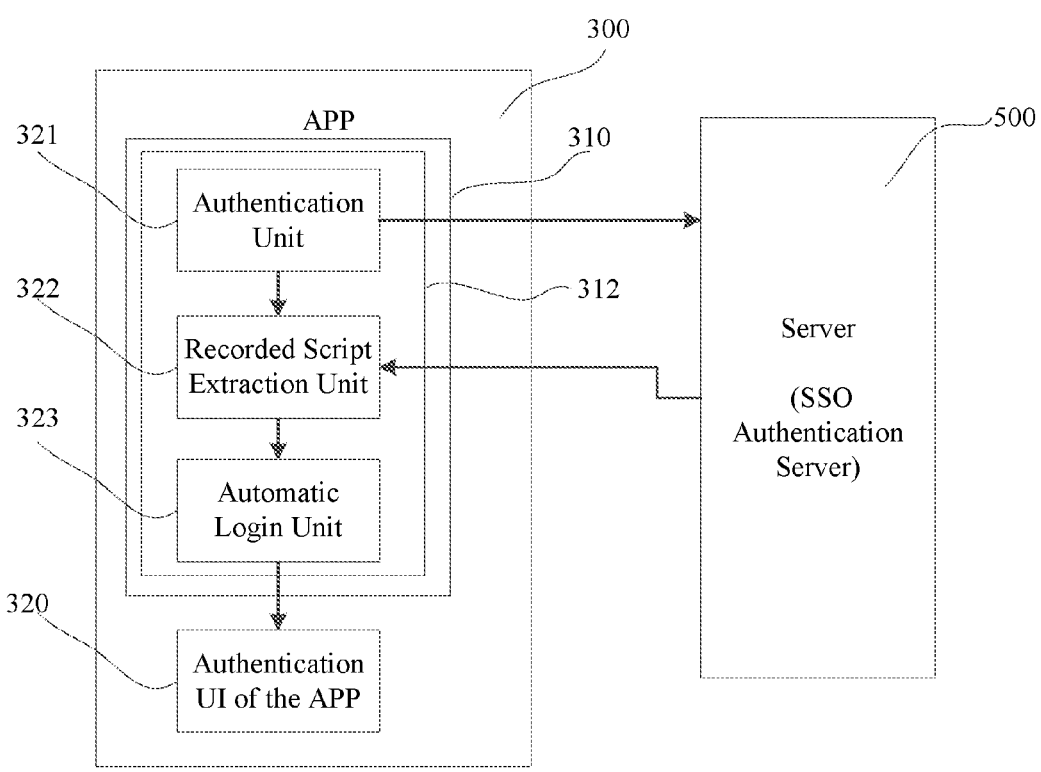
FIG. 4 illustrates a structural diagram of an exemplary terminal SSO authentication system consistent with the disclosed embodiments.

As shown in FIG. 4, in one embodiment, the SSO module 312 may further include an authentication unit 321, a recorded script extraction unit 322, and an automatic login unit 323.

The authentication unit 321 may be configured to obtain the VPN login information, and upload the obtained login information to the server (e.g., VPN SSO authentication server) for verification.

When the verification is successful, the recorded script extract unit 322 may be configured to, according to the login information, obtain the associated recorded script and login parameters of interface elements in the recorded script from the server.

The automatic login unit 323 may be configured to, according to the recorded script, replay the operations and enter the login parameters corresponding to the interface elements to the input controls automatically. Thus, an automated login process may be completed.

In various embodiments, the authentication unit 321 may be configured to implement Step S240 in the exemplary process shown in FIG. 2. The recorded script extraction unit 322 may be configured to implement Step S250 in the exemplary process shown in FIG. 2. The automatic login unit 323 may be configured to implement Step S260 in the exemplary process shown in FIG. 2.

The terminal SSO configuration system 400 may be configured on an individual device or on the terminal device, and be handled by the system administrator to implement various steps shown in FIG. 1. In another embodiment, the terminal SSO configuration system 400 may be configured on the VPN SSO server. The terminal SSO authentication system 310 may be, on the basis of injecting a security tunnel with EMM technologies, injected to the target APP to obtain an application service system (i.e., APP system) capable of implementing the disclosed method. The application service system may include, not only application service modules that provides specific functionalities to the terminal users, but also the recording assistance module 311 and the SSO module 312 as shown in FIG. 3.

In some embodiments, the terminal SSO authentication system 310, the terminal SSO configuration system 400, and the application service system which includes the recording assistance module 311 and the SSO module 312 may run on a same computation system (e.g., the user terminal device). One or more processors of the computation system may implement the functions of the various modules in the terminal SSO authentication system 310, the terminal SSO configuration system 400, and the application service system.

The disclosed SSO configuration system 400 shown in FIG. 3 and the disclosed terminal SSO authentication system 310 shown in FIG. 4 may together implement an SSO solution for injected APPs based on EMM technologies. The user just need to pass the VPN authentication once, and the injected APP may automatically log in to the corporate intranet system. When the VPN authentication is successful, all injected APPs on a same mobile terminal may automatically access the intranet system without the user manually entering verification for the corporate intranet when launching each APP.

The server may be a VPN SSO authentication server 500 configured to manage the recorded script of various APPs, distribute the recorded script of the corresponding APP to the terminal SSO authentication system 310 upon request. In some embodiments, the VPN SSO server may be arranged within the VPN server. Different APPs in the mobile terminal may apply the disclosed method and system to obtain corresponding recorded script and login parameters associated with the VPN login information. Thus, multiple APPs may be capable of automatically signing in to the corporate intranet when the VPN is authenticated one time. Each APP may be injected with the terminal SSO authentication system 310 shown in FIG. 4.

FIG. 1 and FIG. 2 illustrate an exemplary process of one embodiment in the present disclosure. It is understood that, although arrows are sequentially arranged in between various steps in the flow charts shown in FIGS. 1-2, these steps may not necessarily follow the sequences indicated by the arrows. Unless explicitly described in the present disclosure, these steps do not have a particular execution sequence and may be performed in other sequences. Further, one or more steps shown in FIGS. 1-2 may include multiple sub-steps or multiple stages. The sub-steps and stages may not necessarily be executed and completed at a same time. They may be performed at different times. The execution sequence may not be sequential. The sub-steps or stages may be mixed with other steps and performed in turn or alternately.

Those skilled in the art may understand that the disclosed method and system may be implemented by a software with a proper hardware platform. In some embodiments, the disclosed method and system may be implemented by hardware. Accordingly, the disclosed embodiments may be presented in a form of a computer software product. The software product may be stored in a non-volatile computer-readable storage medium (such as ROM, disk, CD-ROM). The software may include a plurality of instructions to be executed by a terminal device (e.g., a cell phone, a computer, a server, or a network equipment) such that the disclosed system and method in various embodiments of the present invention may be implemented.

Figure 5:
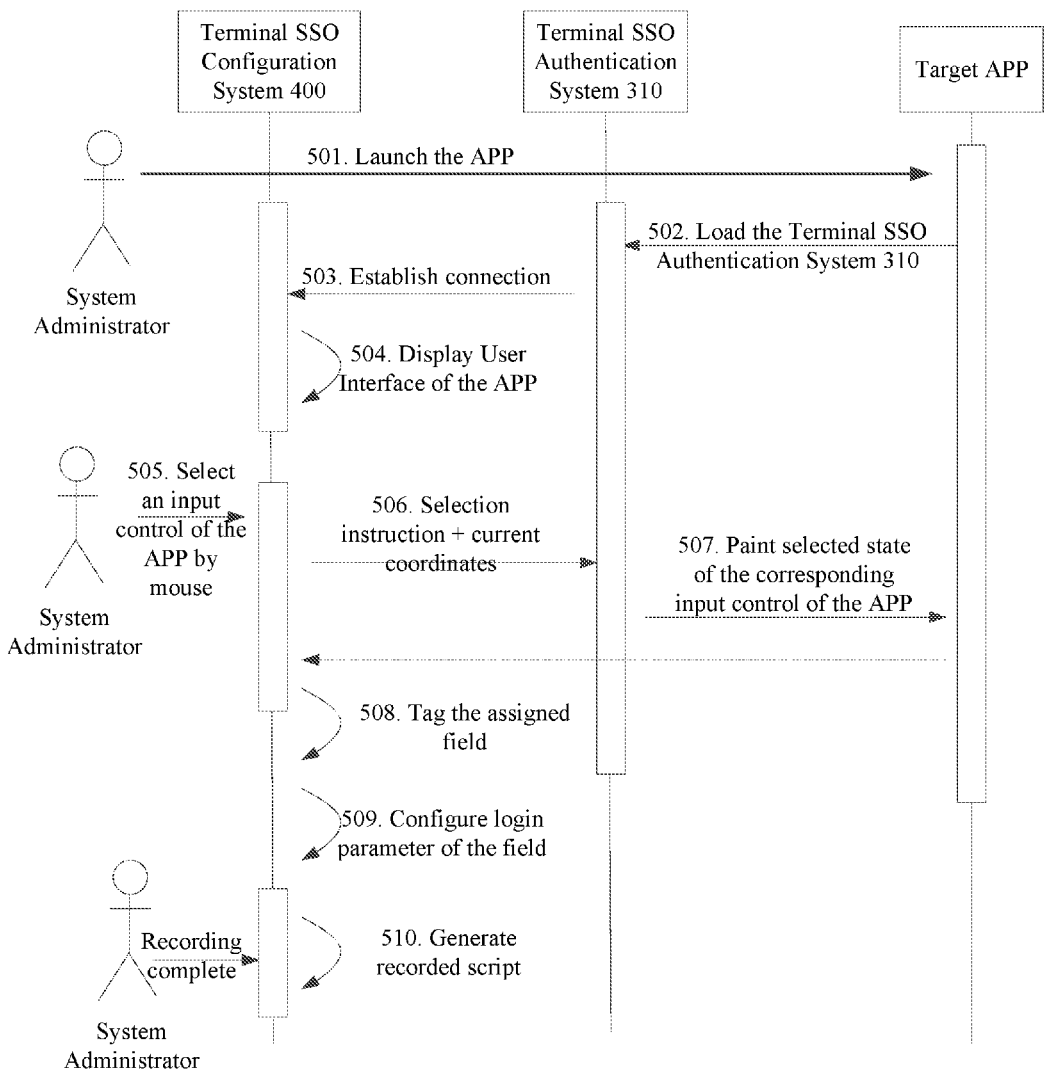
FIG. 5 illustrates an exemplary process of recording script and generating login parameters by an application service system injected with the exemplary SSO authentication system consistent with the disclosed embodiments.

The application service system obtained by injecting the disclosed SSO authentication system 310 based on EMM technologies may implement the script recording process and the SSO authentication process. FIG. 5 illustrates an exemplary process of recording script and generating login parameters by the application service system consistent with the disclosed embodiments.

As shown in FIG. 5, a target APP that has been injected with the terminal SSO authentication system 310 may record script and generate login parameters. The exemplary process may include the following steps.

Step 501. The system administrator may facilitate recording operations. When a one-time recording is completed, the system administrator may configure login information for each user such that each user may be able to connect to the intranet with single sign-on. In operation, the system administrator may launch a target APP that needs recording.

Step 502. The target APP has been injected with the disclosed terminal SSO authentication system 310. When the target APP starts up, the terminal SSO authentication system 310 may be loaded.

Step 503. The terminal SSO authentication system 310 in the target APP may search the terminal SSO configuration system 400 in the corporate intranet, and attempt to establish a connection with the terminal SSO configuration system 400. The terminal SSO configuration system 400 may receive the link request from the target APP, and establish connection with the target APP based on the link request.

Step 504. When the connection between the terminal SSO configuration system 400 and the terminal SSO authentication system 310 of the target APP is established, the terminal SSO authentication system 310 may transmit a real-time screen of the target APP (i.e., the user interface in real time) to the terminal SSO configuration system 400. The real-time screen of the target APP may be displayed on the terminal SSO configuration system 400. Specifically, the terminal SSO configuration system 400 may receive the user interface from the target APP, and generate corresponding interface elements for each input control (and other elements in the UI that needs interaction in the authentication process) in the user interface (e.g., a username input box or a password input box in the user interface). Each interface element may correspond to an input control tag and current coordinates of the input control in the user interface.

Step 505. The system administrator may select one interface element through the terminal SSO configuration system 400. For example, the system administrator may select a username input box or a password input box.

Step 506. A selection instruction may be generated when the system administrator selects the one interface element. The terminal SSO configuration system 400 may send the selection instruction and the current coordinates of the input control in the user interface corresponding to the one interface element to the terminal SSO authentication system 310.

Step 507. According to the coordinates, the terminal SSO authentication system 310 may identify the corresponding input control in the user interface of the target APP. When the input control is an input box, the terminal SSO authentication system 310 may assign the input box with a selected status using a painting instruction (e.g., highlighting the input box, changing an outline color of the input box, showing cursor in the input box). When the input control is a confirmation button, a click instruction may be assigned.

Step 508. When the input box is selected in the target APP, the system administrator may assign the input box as the "username" field, and assign a corresponding field tag. Other fields may include, for example, password, login button, next step button, address input box, etc.

Step 509. The system administrator may configure login parameter for the "username" field, which is the required value of the field when the user actually logs in. In some embodiments, the username may be the same as the VPN username, or a variation of the VPN username based on a certain rule. The password may be the same as the VPN password. The value of the "address input box" field may be configured as a fixed address.

Step 510. The previous steps (e.g., Steps 505-508) may be repeated until all fields corresponding to the input controls are assigned with login parameters and the target APP has completed the login procedure. When the recording is finished, the terminal SSO configuration system 400 may generate a recorded script and upload the recorded script to the VPN SSO authentication server.

Figure 6:
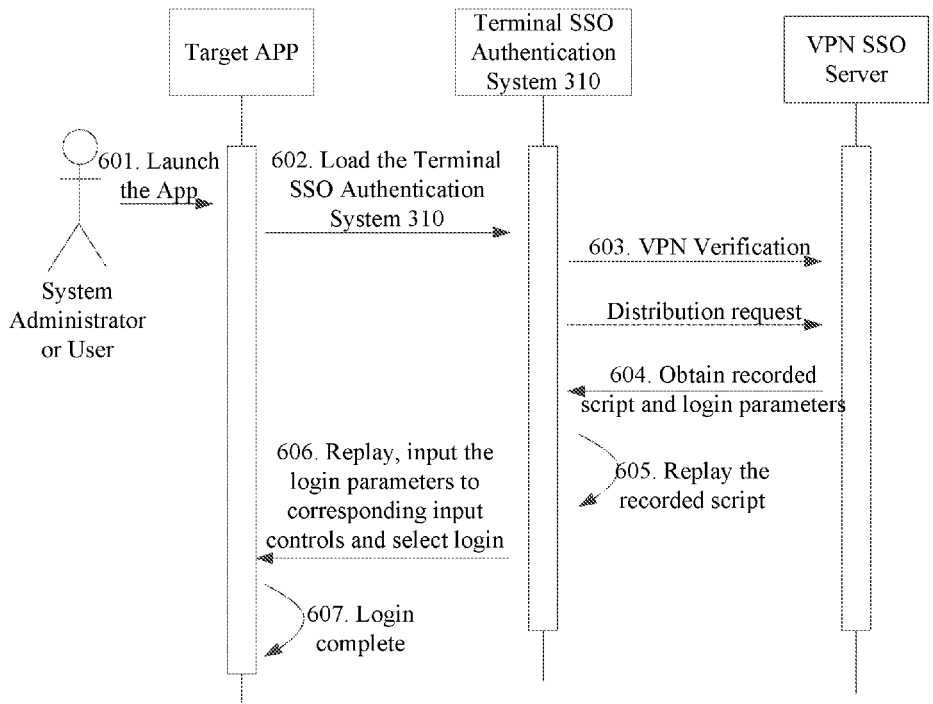
FIG. 6 illustrates an exemplary process of performing single sign-on operations by an application service system injected with the exemplary SSO authentication system consistent with the disclosed embodiments.

A target APP that has been injected with the terminal SSO authentication system 310 may perform an SSO authentication process. Such process is illustrated in FIG. 6.

Step 601. The injected target APP may be installed on the terminal device. The target APP may be launched by a terminal user.

Step 602. The target APP has been injected with the disclosed terminal SSO authentication system 310. When the target APP launches, the terminal SSO authentication system 310 may be loaded.

Step 603. The VPN login information may be obtained and uploaded to the VPN SSO authentication server for verification. The VPN login information may be entered by the terminal user to access the VPN (i.e., the SSO authentication server).

Step 604. When the VPN login is successful, the terminal SSO authentication system 310 may initiate a distribution request to obtain the recorded script and login parameters from the VPN SSO authentication server. The recorded script and login parameters associated with the VPN login information may be previously recorded and configured by the system administrator (e.g., with the terminal SSO configuration system 400).

Step 605. The terminal SSO authentication system 310 may replay operations based on the obtained recorded script, thus automatically performing login operations to access the corporate intranet system.

Step 606. Based on the obtained login parameters, the input controls in the user interface of the target APP may be filled with corresponding login parameters, and the login operations may be completed. For example, username may be entered into the username input box, or a button may be clicked according to the recorded script.

Step 607. When the login is successful, the target APP may have normal access to visit the corporate intranet system with identifications of the terminal user.

The terminal SSO authentication system 310 may be injected into the target APP and run in the process space of the target APP. Thus, the terminal SSO authentication system 310 may control the user interface of the target APP, which may facilitate recording and playback operations in the user interface.

The disclosed single sign-on method is applicable to any target APP with any kind of login screen, as long as the target APP is injected with the SSO authentication system 310. The terminal SSO configuration system 400 may be used to record login operations of the target APP before implementing the single sign-on. The present disclosure does not limit the location of the terminal SSO configuration system 400 (e.g., may run on a PC or a mobile terminal), and does not limit the communication method applied between the terminal SSO configuration system 400 and the SSO authentication system (e.g., online/wireless communication, wired communication through a data cable). The disclosed SSO configuration and authentication method and system may solve, but not limited to, the problem where multiple logins are required to use a same target APP. Further, the disclosed SSO configuration and authentication method and system may be applied to various scenarios where a target APP uses recording and playback mechanisms to achieve single sign-on functionalities.

The SSO configuration terminal system 400 may run on a PC, a mobile phone and other mobile terminals. The SSO configuration terminal system 400 may cooperate with the SSO authentication system 310 to view and record login operations for the target APP. In some embodiments, multiple target APPs (such as target APP1, target APP2, . . . ) on a mobile terminal may be injected with the SSO authentication system 310. When the target APP1 is successfully authenticated through the VPN tunnel, the VPN login information may be shared with other target APPs. That is, the single sign-on of target APP1 may be completed when the VPN login information is entered and authenticated, and the single sign-on of target APP2 may be completed without entering any information because of shared authentication. In some embodiments, the mobile terminal may be installed with an EMM platform that supports multiple application service systems (i.e., multiple target APPs). The user may enter the login information for the private virtual network just one time (e.g., when accessing the EMM platform, or when accessing one of the application service system), and no need to manually input credentials twice when launching other apps. That is, a single sign-on feature may be achieved.

In one embodiment, the mobile terminal may be installed with multiple APPs injected with the SSO authentication system 310 based on EMM technologies. For example, APP1 may be a word processing program, and APP2 may be a database management program. The SSO configuration system 400 may generate a first recorded script of operations to authenticate APP1, and generate a second recorded script of operations to authenticate APP2. The authentication user interfaces of APP1 and APP2 may be different, and/or the login parameters for authenticating APP 1 and APP2 may be different, thus the two recorded script are different. Both recorded scripts are associated with the VPN login information and app info and uploaded to the VPN SSO server. When the user launches APP1 and enters the correct VPN login information, the server may distribute the first recorded script for automatically authenticating APP1. When the user launches APP2 after launching APP1, without entering the VPN login information again, the server may distribute the second recorded script for automatically authenticating APP2. Further, APP3 may be an email service program that has a same authentication user interface and same login parameters as APP1. In this case, when the user launches APP3 after launching APP1, the server may distribute the first recorded script for automatically authenticating APP3.

In one embodiment, when the APP is starting up, the terminal SSO authentication system 310 may detect whether the SSO configuration is completed for the APP (e.g., detecting whether the VPN login information is used for the first time to launch the APP, or inquiring whether the server stores an associated recorded script for the APP). When the SSO configuration is not completed, the system administrator may be notified to perform the recording and uploading steps. When the SSO configuration is completed, the terminal SSO authentication system 310 may realize the single sign-on authentication. In another embodiment, when the system administrator detects that the APP is downloaded through the VPN (i.e., the VPN login information is authenticated) and installed, the system administrator may remotely launch the APP and perform the recording and uploading steps. That is, when the user of the mobile terminal launches the APP, the SSO configuration is already completed. In another embodiment, the system administrator may complete the SSO configuration process for all APPs on the mobile terminal before distributing the mobile terminal to an employee.

It should be noted that, the system administrator may refer to an administration terminal configured to automatically implement the SSO configuration process or semi-automatically implement the SSO configuration process under human supervision. In some embodiments, the administration terminal may be hosted in the VPN SSO server.

For example, for a same type of APP or for APPs with same type of authentication user interface, the operations performed on the input controls may be the same except user-sensitive login parameters. Further, the interface elements generated from the input controls and the operation information of the interface elements are the same. The administration terminal may obtain the operation information of the interface elements and identify the field tags of the interface elements from a stored template. The stored templates may include field tags of the interface elements, values of non-user-sensitive field tags, and operation information of the interface elements for different types of authentication user interfaces. Further, the administration terminal may obtain the user-sensitive login parameters by, for example, generating a variation of the VPN credentials based on a preset rule, or inquiring a list of user credentials that has been previously used in the corporate intranet system. Thus, the administration terminal may automatically perform the terminal SSO configuration process.

Figure 7:
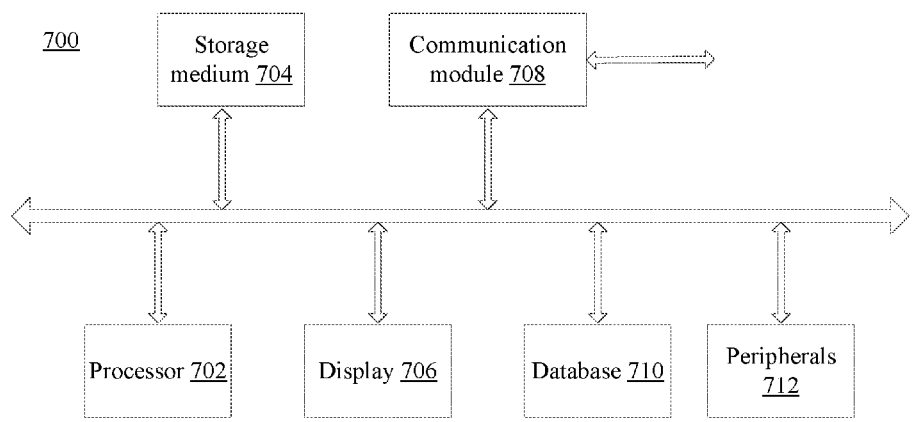
FIG. 7 illustrates a block diagram of an exemplary computer system consistent with the disclosed embodiments.

The SSO configuration system 400, the application service system with the injected SSO authentication system 310, the VPN SSO server may be implemented on any appropriate computing platform. FIG. 7 illustrates a block diagram of an exemplary computer system 700 consistent with the disclosed embodiments.

As shown in FIG. 7, computer system 700 may include a processor 702, a storage medium 704, a monitor 706, a communication module 708, a database 710, and peripherals 712. Certain devices may be omitted and other devices may be included.

Processor 702 may include any appropriate processor or processors. Further, processor 702 can include multiple cores for multi-thread or parallel processing. Storage medium 704 may include memory modules, such as Read-only memory (ROM), Random Access Memory (RAM), flash memory modules, and erasable and rewritable memory, and mass storages, such as CD-ROM, U-disk, and hard disk, etc. Storage medium 704 may store computer programs for implementing various processes, when executed by processor 702.

Further, peripherals 712 may include I/O devices such as keyboard and mouse, and communication module 708 may include network devices for establishing connections through the communication network. Database 710 may include one or more databases for storing certain data and for performing certain operations on the stored data, such as database searching.

In operation, the computer system 700 may implement the SSO configuration system 400 which communicates with the application service system to record and configure the login operations. The application service system may also be implemented by the computer system 700 for assisting the recording procedures with the SSO configuration system and for automatically logging the APP on to the VPN when the recording and configuration is completed, such that the single sign-on feature may be accomplished.

The present disclosure provides a terminal single sign-on configuration and authentication method and system, and an application service system that supports terminal single sign-on configuration and authentication. With the disclosed method or system, a plurality of application service systems (APPs) based on EMM technologies may be capable of automatically logging on to the corporate intranet system when the login information is provided once.

The disclosed terminal single sign-on configuration and authentication method and system may, by recording operations performed by a system administrator and saving login parameters entered by the system administrator to access a virtual private network, implement single sign-on functionalities for users of one or more APPs on a same mobile terminal to access the virtual private network Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A terminal single sign-on (SSO) configuration method for an enterprise mobile management (EMM) system, comprising:

establishing a connection between a configuration system and an application service system, wherein the application service system refers to an application program installed on a mobile terminal associated with the EMM system, and the configuration system includes at least a hardware processor and a memory;

receiving in real time, by the hardware processor of the configuration system, a user interface for authentication from the application service system;

generating, by the hardware processor of the configuration system, interface elements corresponding to input controls in the user interface received from the application service system in real time, wherein each interface element generated by the configuration system corresponds to a tag of an input control and current coordinates indicating a location of the input control presented in the user interface for authentication of the application program;

sequentially transmitting, by the hardware processor of the configuration system, operation information and login parameters of the interface elements from the configuration system to the application service system, wherein the operation information includes a selection instruction generated when a first interface element is chosen by the configuration system, and first current coordinates of a first input control in the user interface that is corresponded to the first interface element;

sequentially recording, by the hardware processor of the configuration system, a plurality of operations on the input controls in the user interface according to the operation information and the login parameters of the corresponding interface elements, wherein the plurality of operations completes an authentication process for the application service system;

generating, by the hardware processor of the configuration system, a recorded script containing the plurality of operations and the login parameters of the interface elements;

associating, by the hardware processor of the configuration system, a VPN (virtual private network) login information with the recorded script;

uploading, by the hardware processor of the configuration system, the VPN login information and the associated recorded script to a server and wherein when the application service system is launched next time on the mobile terminal, the application service system automatically obtains the recorded script associated with the VPN login information from the server, and automatically replays the plurality of operations to complete the authentication process.

2. The terminal single sign-on configuration method according to claim 1, wherein:

the application service system is configured to send a link request to a virtual private network (VPN) when the VPN login information is received;

the server is configured to verify the VPN login information and facilitate the connection between the application service system and the VPN; and when the authentication process is completed by the plurality of operations, the application service system gains access to a corporate intranet system through the VPN.

3. The terminal single sign-on configuration method according to claim 1, wherein:

the plurality of operations are performed, by the application service system, on the input controls and displayed in the user interface; and each operation includes: based on the selection instruction and the current coordinates of the input control corresponding to the chosen interface element, selecting the input control; and based on the login parameter of the chosen interface element, entering the login parameter to the input control.

4. The terminal single sign-on configuration method according to claim 1, further comprising:

assigning a field tag to an interface element;

obtaining the login parameter configured for the field tag; and corresponding and saving the field tag with the login parameter of the interface element.

5. A terminal single sign-on authentication method, comprising:

obtaining, by a hardware processor of an application service system, a VPN login information for accessing a private virtual network, wherein the application service system is installed on a mobile terminal;

uploading, by the hardware processor of the application service system, the VPN login information to a server for verification;

when the VPN login information is successfully verified, obtaining, from the server, a recorded script associated with the VPN login information, the recorded script containing a plurality of operations and login parameters corresponding to input controls in a user interface of the application service system for authentication, wherein the plurality of operations is sequentially transmitted and sequentially recorded according to operation information and the login parameters from a configuration system before implementing the single sign-on authentication, the operation information includes a selection instruction generated when a first interface element is chosen by the configuration system, and first current coordinates of a first input control in the user interface that is corresponded to the first interface element and according to the recorded script, automatically replaying, by the hardware processor of the application service system, the plurality of operations to input the login parameters to the corresponding input controls in the user interface, including performing the selection instruction of the first input control located at the first current coordinates in the user interface, such that an authentication process for the application service system is completed automatically.

6. The terminal single sign-on authentication method according to claim 5, wherein:
the server is configured to verify the VPN login information and facilitate the connection between the application service system and the VPN; and
when the authentication process is completed by the plurality of operations, the application service system gains access to a corporate intranet system through the VPN.

7. The terminal single sign-on authentication method according to claim 6, wherein:
the mobile terminal is installed with a second application service system that requires access to the corporate intranet system through the VPN;
the terminal single sign-on authentication method further comprises:
when the VPN login information is successfully verified for the application service system, launching the second application service system without requesting the VPN login information, wherein a successful VPN verification is shared with the second application service system; and
obtaining, from the server, a second recorded script associated with the VPN login information, the second recorded script containing a plurality of operations and login parameters corresponding to input controls in a user interface of the second application service system for authentication; and
according to the second recorded script, automatically replaying the plurality of operations to input the login parameters to the corresponding input controls in the user interface of the second application service system, such that an authentication process for the second application service system is completed automatically.

8. The terminal single sign-on authentication method according to claim 6, wherein:
the mobile terminal is installed with a third application service system that requires access to the corporate intranet system through the VPN;
a user interface of the third application service system for authentication is the same as the user interface of the application service system; and
the terminal single sign-on authentication method further comprises:
when the VPN login information is successfully verified for the application service system, launching the third application service system without requesting the VPN login information, wherein a successful VPN verification and the recorded script are shared with the third application service system; and
according to the recorded script, automatically replaying the plurality of operations to input the login parameters to the corresponding input controls in the user interface of the third application service system, such that an authentication process for the third application service system is completed automatically.

9. The terminal single sign-on authentication method according to claim 5, further comprising assisting the configuration system to generate the recorded script before implementing the single sign-on authentication, including:
establishing a connection with the configuration system;
sending, in real time, the user interface for authentication to the configuration system, wherein the configuration system generates interface elements corresponding to input controls in the user interface, wherein each interface element generated by the configuration system corresponds to a tag of an input control and current coordinates indicating a location of the input control presented in the user interface for authentication of the application program; and the generated interface elements includes the first interface element;
receiving the operation information and the login parameters of the interface elements from the configuration system; and
according to the operation information and the login parameters of the interface elements, sequentially performing the plurality of operations on the corresponding input controls, and displaying the plurality of operations in the user interface;
wherein the configuration system sequentially records the plurality of operations and the login parameters, generates the recorded script containing the plurality of operations and the login parameters of the interface elements; associates the VPN login information with the recorded script; and uploads the VPN login information and the associated recorded script to the server.

10. A terminal single sign-on authentication system, comprising a memory and one or more hardware processors coupled to the memory,
wherein the one or more hardware processors are configured to:
obtain, through an application service system, a VPN login information for accessing a private virtual network, wherein the application service system is installed on a mobile terminal;
upload the VPN login information to a server for verification;
when the VPN login information is successfully verified, obtain, from the server, a recorded script associated with the VPN login information, the recorded script containing a plurality of operations and login parameters corresponding to input controls in a user interface of the application service system for authentication, wherein the plurality of operations is sequentially transmitted and sequentially recorded according to operation information and the login parameters from a configuration system before implementing the single sign-on authentication, the operation information includes a selection instruction generated when a first interface element is chosen by the configuration system, and first current coordinates of a first input control in the user interface that is corresponded to the first interface element and
according to the recorded script, automatically replay the plurality of operations to input the login parameters to the corresponding input controls in the user interface, including performing the selection instruction of the first input control located at the first current coordinates in the user interface, such that an authentication process for the application service system is completed automatically.

11. The terminal single sign-on authentication system according to claim 10, wherein:
the server is configured to verify the VPN login information and facilitate the connection between the application service system and the VPN; and
when the authentication process is completed by the plurality of operations, the application service system gains access to a corporate intranet system through the VPN.

12. The terminal single sign-on authentication system according to claim 11, wherein:
the mobile terminal is installed with a second application service system that requires access to the corporate intranet system through the VPN;
the one or more processors are further configured to:
when the VPN login information is successfully verified for the application service system, launch the second application service system without requesting the VPN login information, wherein a successful VPN verification is shared with the second application service system; and
obtain, from the server, a second recorded script associated with the VPN login information, the second recorded script containing a plurality of operations and login parameters corresponding to input controls in a user interface of the second application service system for authentication; and
according to the second recorded script, automatically replay the plurality of operations to input the login parameters to the corresponding input controls in the user interface of the second application service system, such that an authentication process for the second application service system is completed automatically.

13. The terminal single sign-on authentication system according to claim 11, wherein:
the mobile terminal is installed with a third application service system that requires access to the corporate intranet system through the VPN;
a user interface of the third application service system for authentication is the same as the user interface of the application service system; and
the terminal single sign-on authentication method further comprises:
when the VPN login information is successfully verified for the application service system, launch the third application service system without requesting the VPN login information, wherein a successful VPN verification and the recorded script are shared with the third application service system; and
according to the recorded script, automatically replay the plurality of operations to input the login parameters to the corresponding input controls in the user interface of the third application service system, such that an authentication process for the third application service system is completed automatically.

14. The terminal single sign-on authentication system according to claim 10, wherein the one or more processors are further configured to, cooperate with the configuration system to generate the recorded script before implementing the single sign-on authentication, including:

establishing a connection with the configuration system;
sending, in real time, the user interface for authentication to the configuration system, wherein the configuration system generates interface elements corresponding to input controls in the user interface, wherein each interface element generated by the configuration system corresponds to a tag of an input control and current coordinates indicating a location of the input control presented in the user interface for authentication of the application program; and the generated interface elements includes the first interface element;
receiving the operation information and the login parameters of the interface elements from the configuration system; and
according to the operation information and the login parameters of the interface elements, sequentially performing the plurality of operations on the corresponding input controls, and displaying the plurality of operations in the user interface;
wherein the configuration system sequentially records the plurality of operations and the login parameters, generates the recorded script containing the plurality of operations and the login parameters of the interface elements; associates the VPN login information with the recorded script; and uploads the VPN login information and the associated recorded script to the server.

15. The terminal single sign-on configuration method according to claim 1, further comprising:
after generating the interface elements and before sequentially transmitting the operation information and the login parameter,
displaying, by the configuration system, the interface elements associated with authentication the application program;
obtaining, by the configuration system, the operation information and the login parameter based on operations performed by a system administrator of the configuration system.

16. The terminal single sign-on configuration method according to claim 15, further comprising:
in response to the selection instruction being generated when the first interface element is chosen by the configuration system, receiving, by the application service system, the selection instruction in a feedback from the configuration system;
determining, by the application service system, the first input control in the user interface as corresponding to the first interface element; and
selecting, by the application service system, the first input control according to the selection instruction.

* * * * *